US007711877B2

(12) United States Patent
Ono

(10) Patent No.: US 7,711,877 B2
(45) Date of Patent: May 4, 2010

(54) IMAGE SENSING DEVICE

(75) Inventor: Tachio Ono, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/447,860

(22) Filed: Jun. 7, 2006

(65) Prior Publication Data
US 2006/0242340 A1    Oct. 26, 2006

Related U.S. Application Data

(63) Continuation of application No. PCT/JP2004/018737, filed on Dec. 15, 2004.

(30) Foreign Application Priority Data

Dec. 15, 2003  (JP) .............................. 2003-416912

(51) Int. Cl.
*G06F 13/00*    (2006.01)
(52) U.S. Cl. ....................... 710/100; 710/305; 710/314; 348/207.1; 714/56
(58) Field of Classification Search ............... 348/207.1; 710/100, 305, 314; 714/54, 57
See application file for complete search history.

(56) References Cited

U.S. PATENT DOCUMENTS

| 5,364,390 | A  | * | 11/1994 | Taboada et al. ............... 606/10 |
| 6,078,400 | A  | * | 6/2000  | Mizutani .................... 358/1.14 |
| 6,211,909 | B1 | * | 4/2001  | Maeshima et al. ..... 348/207.99 |
| 6,434,643 | B1 | * | 8/2002  | Ejiri ............................ 710/58 |
| 6,453,071 | B2 |   | 9/2002  | Ito et al. |
| 6,583,809 | B1 | * | 6/2003  | Fujiwara ................... 348/14.12 |
| 6,678,769 | B1 |   | 1/2004  | Hatae et al. |
| 6,690,648 | B2 |   | 2/2004  | Niida et al. |
| 6,772,266 | B2 | * | 8/2004  | Nalawadi .................... 710/305 |

(Continued)

FOREIGN PATENT DOCUMENTS

JP    10-285564    10/1998

(Continued)

OTHER PUBLICATIONS

Intel Corporation. Universal Host Controller Interface (UHCI) Design Guide. Revision 1.1. Mar. 1996.*

(Continued)

*Primary Examiner*—Mark Rinehart
*Assistant Examiner*—Matthew D Spittle
(74) *Attorney, Agent, or Firm*—Fitzpatrick, Cella, Harper & Scinto

(57) ABSTRACT

An image sensing device includes an image sensing unit, an interface unit, a control endpoint, an isochronous endpoint, a bulk endpoint, an interrupt endpoint, and an interface unit controller. The image sensing unit senses a moving image and a still image. The interface unit is connected to an external device. The control endpoint receives from the external device a command requesting transfer of the still image. The isochronous endpoint transfers the moving image sensed by the image sensing unit to the external device. The bulk endpoint transfers the still image sensed by the image sensing unit to the external device. The interrupt endpoint transfers error information. The error information includes information indicating that an error has occurred during sensing of the still image. The interface unit controller transfers the error information to the external device through the interrupt endpoint in response to the occurrence of the error.

6 Claims, 11 Drawing Sheets

U.S. PATENT DOCUMENTS

| | | | |
|---|---|---|---|
| 6,804,250 | B2 | 10/2004 | Hatae et al. |
| 6,895,003 | B1 | 5/2005 | Kobayashi et al. |
| 6,897,891 | B2 * | 5/2005 | Itsukaichi ............... 348/14.1 |
| 7,002,964 | B1 | 2/2006 | Ohnishi et al. |
| 7,043,589 | B2 * | 5/2006 | Chang et al. ............. 710/305 |
| 7,158,168 | B2 * | 1/2007 | Houlberg ................. 348/169 |
| 2003/0172201 | A1 | 9/2003 | Hatae et al. |
| 2004/0120691 | A1 * | 6/2004 | Ohnishi ................... 386/46 |
| 2006/0242340 | A1 | 10/2006 | Ono |
| 2006/0262107 | A1 * | 11/2006 | Feuchtgruber et al. ...... 345/204 |

FOREIGN PATENT DOCUMENTS

| | | |
|---|---|---|
| JP | 11-313091 | 11/1999 |
| JP | 2001177746 A * | 6/2001 |

OTHER PUBLICATIONS

USB Implementers FOrum. USB Mass Storage Class CBI Transport Specification. Revision 1.1. Jun. 23, 2003.*

Trodden, Jay. EHCI: Enhanced Host Controller Interface for USB 2.0. A Survey of Major Features. Sep. 10, 2001.*

Universal Serial Bus Specification, Revision 2.0, pp. 15-84 and 195-238, Apr. 27, 2000.

* cited by examiner

FIG. 2

| Offset 0 | 1 | 2 | 4 | 6 |
|---|---|---|---|---|
| bmRequestType | bRequest | wValue | wIndex | wLength |
| SET_INTERFACE 0x0B | 0000 0001b | ALTERNATE SETTING NUMBER 1 | INTERFACE NUMBER 1 | 0 |

FIG. 3

| | | |
|---|---|---|
| 0 | DESCRIPTOR LENGTH | ~301 |
| 1 | DESCRIPTOR TYPE | ~302 |
| 2 | DESCRIPTOR SUB TYPE | ~303 |
| 3 | FORMAT IDENTIFIER | ~304 |
| 19 | SUB FORMAT IDENTIFIER | ~305 |
| 35 | ⋮ | |

FIG. 9

| bmRequest Type | bRequest | wValue | wIndex | wLength | Data |
|---|---|---|---|---|---|
| 00100001 | SET_CUR | TRIGER | Zero and Interface | 1 | xxx |
| 1101 | 1102 | 1103 | 1104 | 1105 | 1106 |

F I G. 10

| 0x01 | STILL IMAGE TRANSFER REQUEST IN SAME PATH AS VIDEO TRANSMISSION PATH |
| --- | --- |
| 0x02 | STILL IMAGE TRANSFER REQUEST IN PATH DIFFERENT FROM VIDEO TRANSMISSION PATH |
| 0x03 | INTERRUPT STILL IMAGE TRANSFER REQUEST |

# IMAGE SENSING DEVICE

This application is a continuation application of Application No. PCT/JP2004/018737, filed Dec. 15, 2004.

TECHNICAL FIELD

The present invention relates to an image sensing device such as a digital video camera and the like.

BACKGROUND ART

As one of digital interfaces that can transfer moving image data, a USB interface is known. The USB interface is a digital interface complying with the USB (Universal Serial Bus) standard (see, for example, "Universal Serial Bus Specification Revision 2.0, Apr. 27, 2000").

In the USB standard, a transfer method called isochronous transfer is specified to guarantee real-time moving image transfer. Also, the USB standard specifies that a host controller transmits a sync signal called start-of-frame (SOF) to respective devices. A device that transfers moving image data transfers moving image data by isochronous transfer in synchronism with SOF, thus allowing real-time transfer of moving image. When isochronous transfer is made, a bandwidth for transfer must be assured. However, in case of the USB standard, each device notifies the host controller of an alternate setting interface, which indicates a bandwidth required for isochronous data transfer, using a descriptor, and the host controller selects an alternate setting interface using a Set_Interface request to each device, thus assuring the bandwidth.

FIG. 1 is a schematic view of a descriptor held by a device which transfers moving image data by isochronous transfer. Reference numeral 101 denotes a device descriptor used to notify a vendor ID, product ID, and the like; 102, a configuration descriptor used to notify the configuration that the device can assume; 103, a descriptor indicating alternate setting 0 of interface #1 used in the configuration 102; and 104, an end point descriptor used by the interface 103 (MaxPayload that indicates the bandwidth as isochronous transfer type is 0). Reference numeral 105 denotes an interface descriptor which indicates alternate setting 1 of interface #1; and 106, an end point descriptor when interface #1 is selected as alternate setting 1 (MaxPavload that indicates the bandwidth as isochronous transfer type is 512). Therefore, when the host controller selects alternate setting 1 of interface #1 using a Set_Interface request shown in FIG. 2, data transfer for 512 bytes are guaranteed for a period of each SOF (1-ms period in case of Full Speed (USB standard); 125-μs period in case of High Speed), and a device which holds this descriptor can isochronously transfer data.

The USB standard has no specification of data in isochronous transfer, and data to be transferred is not limited. That is, devices must exchange information about a data format and the like. For example, in the USB standard, a host controller device as a transfer destination can be notified of a stream data format to be isochronously transferred using a descriptor.

FIG. 3 shows an example of a descriptor used to notify a host controller of the stream format used in transfer. Reference numeral 301 denotes a descriptor length; and 302 and 303, a descriptor type indicating, e.g., a descriptor used to notify the stream format. Reference numerals 304 and 305 denote an identifier indicating the stream format to be transmitted as isochronous data. The host controller reads these values to recognize the stream format used in transmission of a device that holds the descriptor of FIG. 3, thus processing the received stream data.

FIG. 4 is a chart simply showing the data flow upon supplying moving image data on USB. A host acquires a descriptor indicating the stream format from a device using Get Descriptor (step 401), and changes an alternate setting to 1 using Set Interface (step 402). After that, the host transmits IN TOKEN to the device for each SOF (steps 403 to 405), and the device isochronously transfers data to be transferred (Iso data) to the host after reception of IN TOKEN (steps 406 to 408).

FIG. 5 time-serially shows the data flow on USB. SOF 51 is transmitted from a host to have a width 504 for 1 ms (125 μs in case of High Speed), and IN TOKEN 502 is similarly transferred from the host to an isochronous end point of a device. The device transfers data 503 via the isochronous end point after IN TOKEN 502. The device can transmit data in response to IN TOKEN for each period. When it becomes impossible to make data transfer at the timing of 505, the device can skip data transfer, and can transfer data in the next period.

When real-time data transfer is made using the USB interface, a bus bandwidth must be assured for transfer to guarantee realtimeness.

DISCLOSURE OF INVENTION

Problems that the Invention is to Solve

When a digital video camera that isochronously transfers moving image data using the USB interface has only one isochronous end point, the following drawbacks are posed. For example, in a digital camera which, can sense still image data during sensing moving image data, when moving image data and still image data sensed together with that moving image data are to be transferred to a host such as a personal computer or the like, if only one isochronous end point is used, transfer of moving image data must be interrupted. Also, in the arrangement with only one isochronous end point, a message of an error that has occurred in the digital video camera cannot be sent to the host such as a personal computer or the like via the USB interface.

It is, therefore, an object of the present invention to solve the aforementioned drawbacks. For example, the present invention has as its object to transfer sensed still image data without interrupting transfer of moving image data whose image sensing is in progress.

Means of Solving the Problems

An image sensing device according to the present invention has, for example, an image sensing controller for sensing a moving image and a still image, a digital interface for communicating with an external device, and a digital interface controller for forming a first end point used to transfer the moving image by isochronous transfer and a second end point used to asynchronously transfer the still image in the digital interface, and independently and simultaneously forming a first logical transmission path for a moving image connected to the first end point and a second logical transmission path for a still image connected to the second end point between the image sensing device and the external device.

A control method according to the present invention is directed to, for example, a method of controlling an image sensing device for transmitting a moving image and a still image to an external device, the image sensing device comprising a digital interface which includes a first end point used to transfer the moving image in an isochronous transfer mode and a second end point used to asynchronously transfer the still image in the digital interface, and independently and simultaneously forming a first logical transmission path for a moving image connected to the first end point and a second logical transmission path for a still image connected to the second end point between the image sensing device and the external device, the control method comprising a step of notifying the external device of the isochronous transfer mode for the first transmission path and the asynchronous transfer mode for the second transmission path, a step of transferring the moving image in real time to the external device via the first end point and the first logical transmission path, a step of sensing the still image in response to a first request from the external device, and a step of transferring the still image to the external device via the second end point and the second logical transmission path in response to a second request from the external device while maintaining transfer in the transfer step.

Note that other objects and features of the present invention will be explained in the description of the following embodiments.

BRIEF DESCRIPTION OF DRAWINGS

FIG. 2 shows the structure of a SET_INTERFACE request specified by the USB standard;

FIG. 3 shows an example of a descriptor which is specified by the USB standard and is held by a device;

FIG. 9 is a view showing an example of a request structure of a still image transfer request command;

FIG. 10 is a view for explaining an example of values to be set in the request structure of the still image transfer request command.

BEST MODE FOR CARRYING OUT THE INVENTION

Preferred embodiments of the present invention will now be described in detail in accordance with the accompanying drawings. Note that all the following embodiments will explain those which adopt a digital video camera as an example of an image sensing device. However, image sensing devices other than the digital video camera can be adopted as long as they can sense a moving image and can also sense a still image. For example, devices such as a digital still camera, a portable phone with a camera function, and the like may be adopted.

First Embodiment

Figure 1:
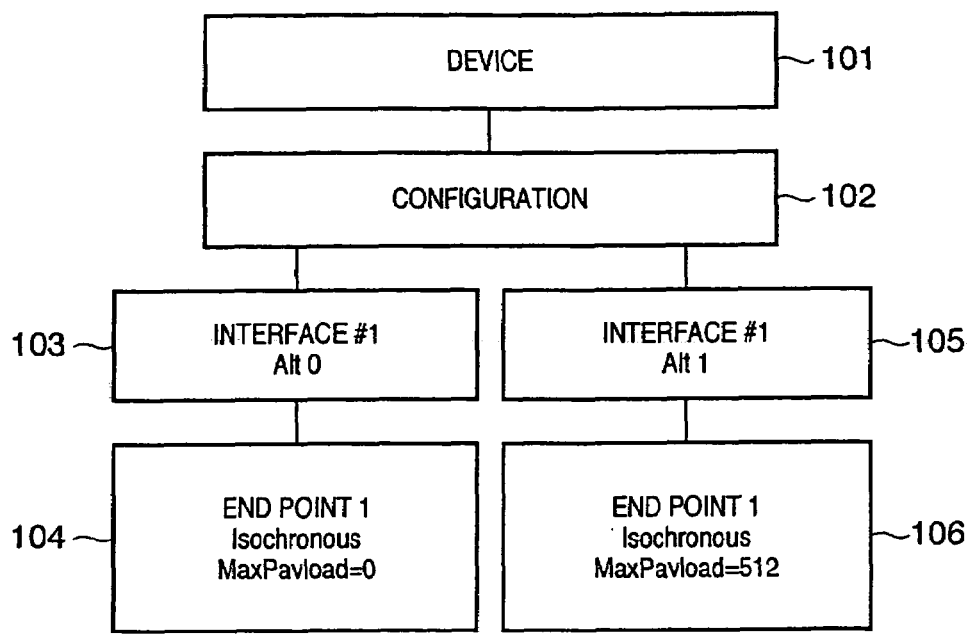
FIG. 1 is a schematic view showing the structure of a descriptor specified by the USB standard.
Figure 4:
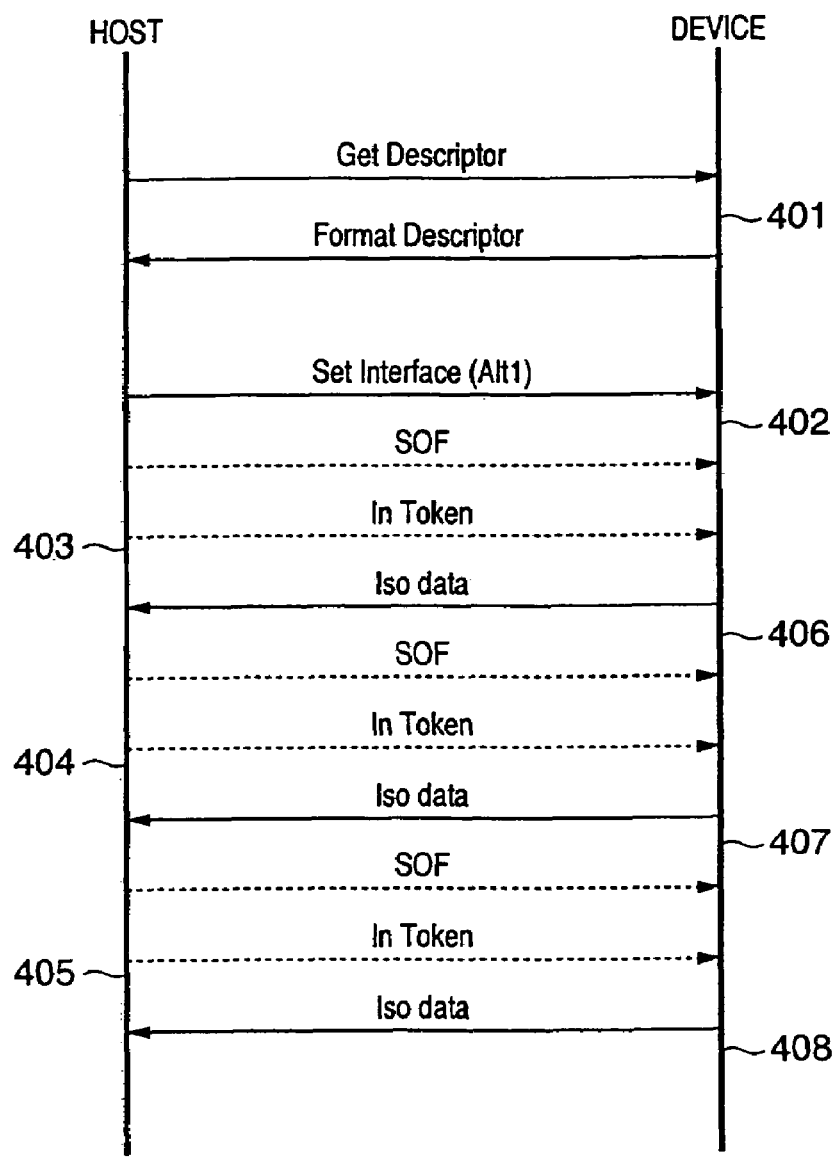
FIG. 4 is a chart for explaining the transfer sequence based on isochronous transfer between a host and device.
Figure 5:
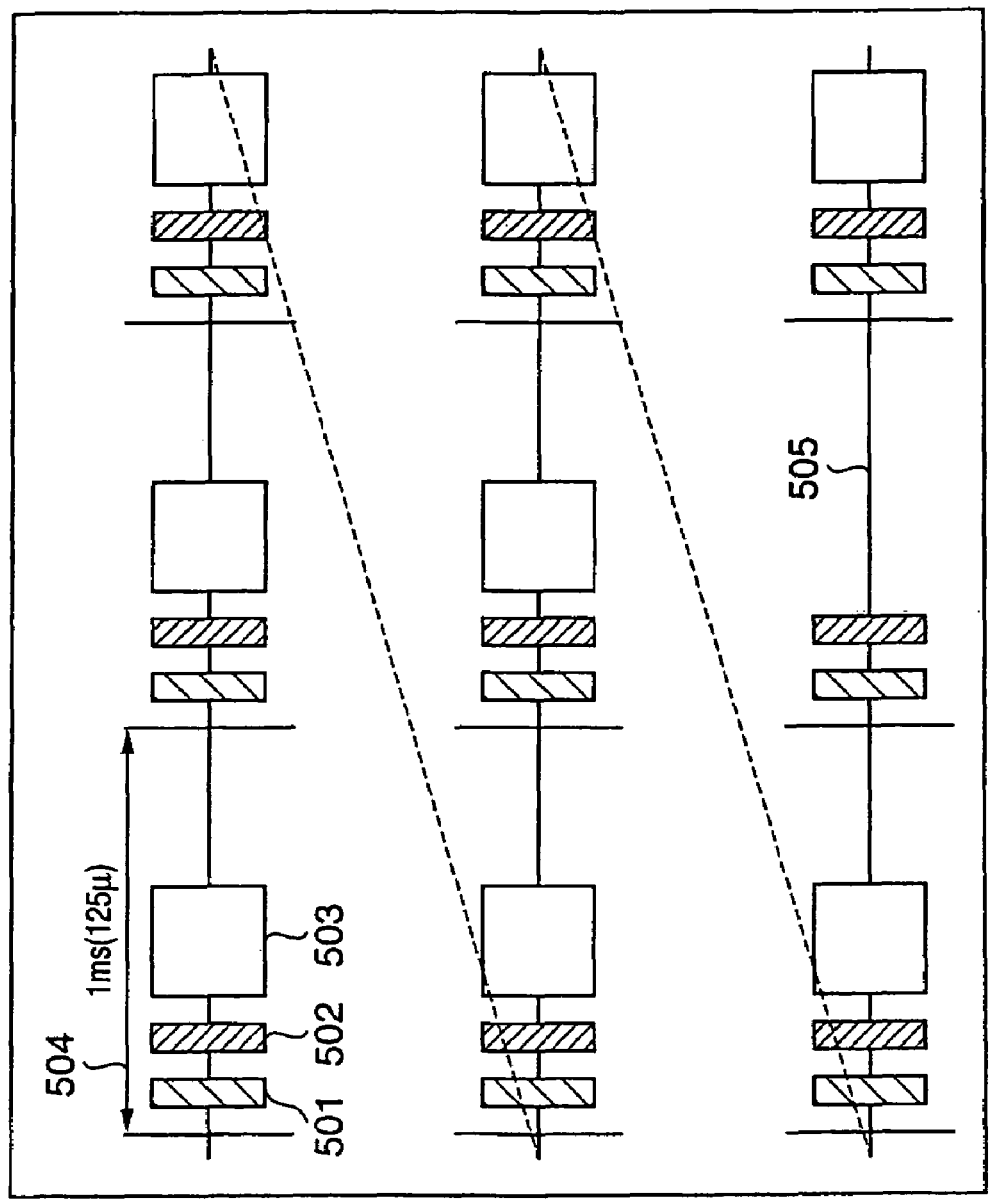
FIG. 5 is a view for explaining the state of a bus.
Figure 6:
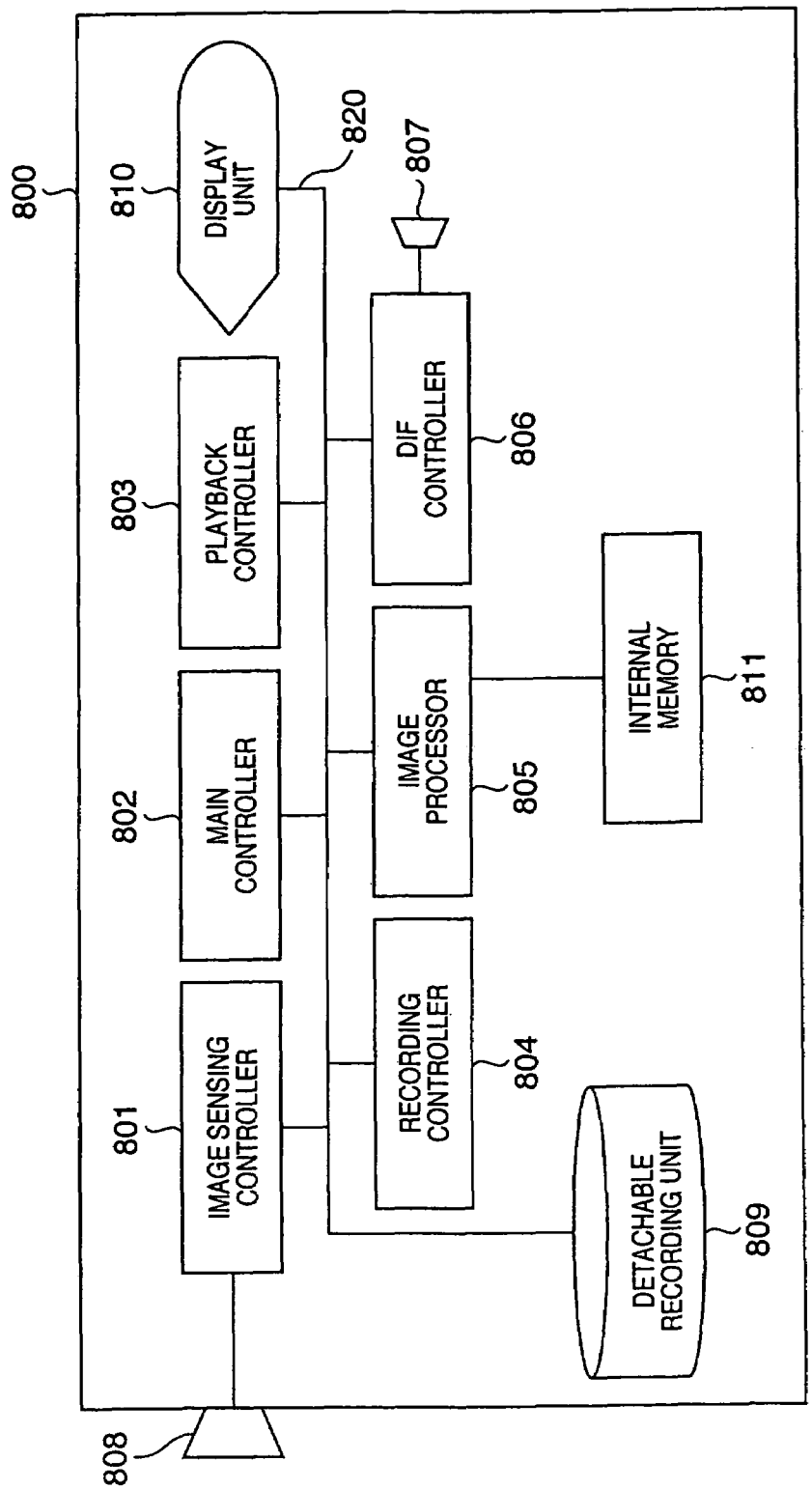
FIG. 6 is a block diagram showing the arrangement of a digital video camera as an example of an image sensing device according to the first embodiment of the present invention.

FIG. 6 is a block diagram showing the arrangement of a digital video camera 800 as an example of the image sensing device according to the first embodiment of the present invention. Note that the digital video camera 800 is a device having a function as a "device complying with the USB standard" (to be referred to as a USB device hereinafter).

Referring to FIG. 6, upon recording, an image sensing controller 801 controls an image sensing unit 808 to sense a moving image and still image of an object. Moving image and still image data captured by the image sensing unit 808 are compressed to appropriate moving image and still image formats by an image processor 805. The compressed data are transferred to and recorded on a detachable recording unit 809 via a recording controller 804. On the other hand, upon playback, the moving image and still image recorded on the detachable recording unit 809 are read out by a playback controller 803, and are expanded to the appropriate moving image and still image formats by the image processor 805. The expanded data are transferred to and displayed on a display unit 810. When an external device is connected to a digital interface 807, moving image and still image data compressed by the image processor 805 are output via the digital interface 807 under the control of a DIF controller 806. The digital interface 807 complies with the USB standard. Respective units in the digital video camera 800 are interconnected via a data/address bus 820, and are controlled by a main controller 802. Note that this control can also be implemented according to computer programs.

Figure 7:
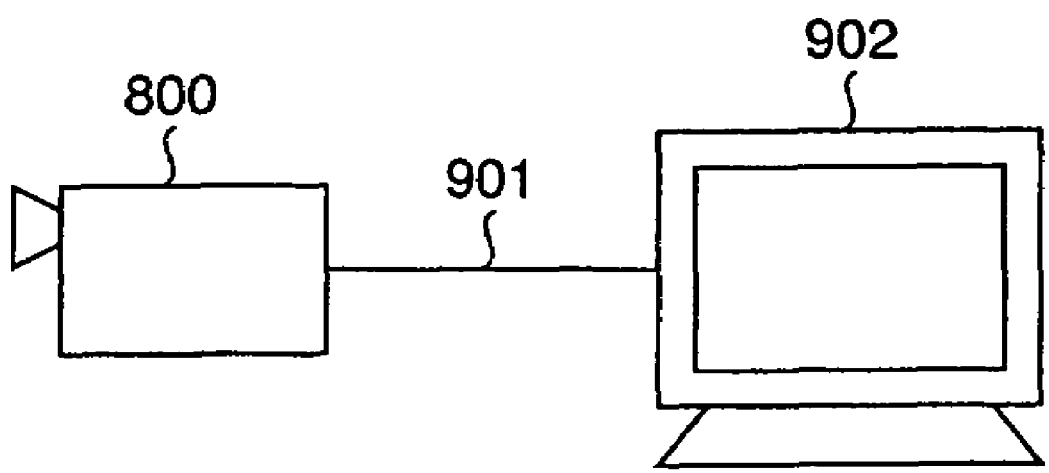
FIG. 7 is a block diagram showing the arrangement of an image sensing system according to the first embodiment of the present invention.

FIG. 7 is a block diagram showing the arrangement of an image sensing system in the first embodiment. Referring to FIG. 7, reference numeral 901 denotes a USB network; and 902, a PC (personal computer) as an example of a control device that controls the digital video camera 800. Note that the PC 902 is a device having a function as a "host controller" in the USB standard. The PC 902 acquires moving image data sensed by the digital video camera 800 in real time via the USB network 901. The PC 902 can transmit a still image transfer request command (to be described later) to the digital video camera 800 via the USB network 901. At this time, the PC 902 must change the contents of the still image transfer request command in accordance with a still image transfer mode supported by the digital video camera 800. In this embodiment, assume that three still image transfer modes are available, and are respectively called still image transfer mode 1 (see 0x01 in FIG. 10), still image transfer mode 2 (see 0x02 in FIG. 10), and still image transfer mode 3 (see 0x03 in FIG. 10).

The PC 902 must detect the still image transfer mode supported by the digital video camera 800 in advance. This information can be detected by reading a descriptor of the digital video camera 800. The descriptor describes various methods associated with the digital video camera 800. After the PC 902 reads the descriptor from the digital video camera 800, it can detect which of still image transfer modes 1, 2, and 3 the digital video camera 800 supports.

Figure 8:
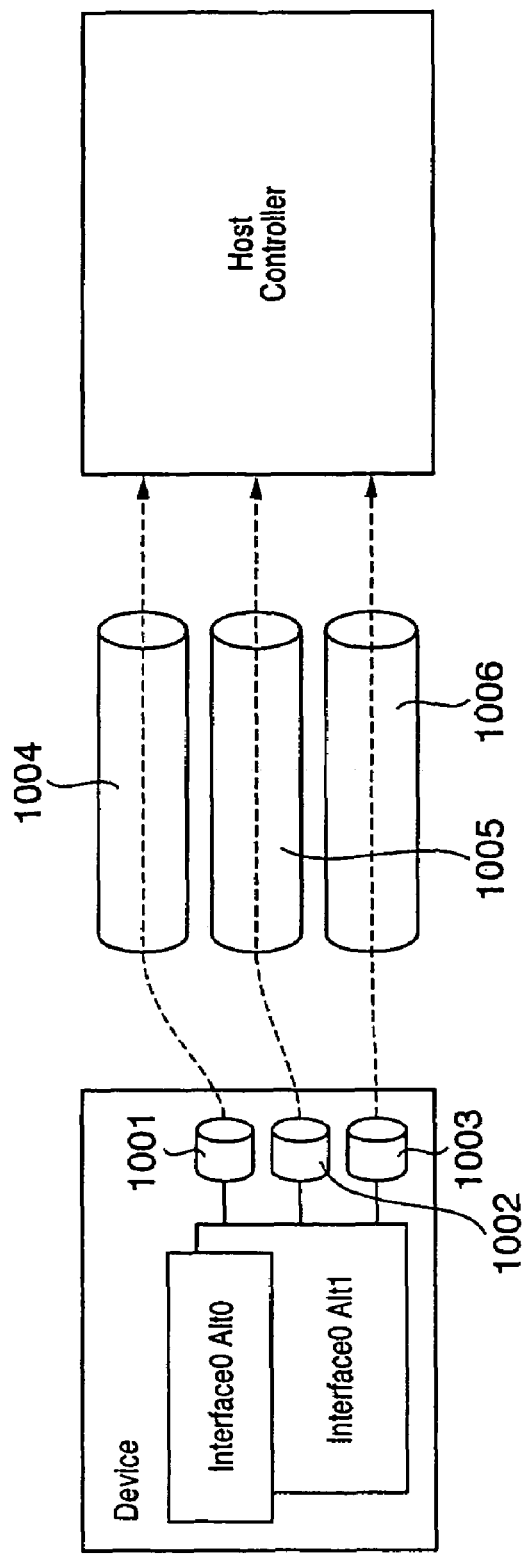
FIG. 8 is a diagram for explaining end points of the image sensing device according to the first embodiment of the present invention.

The digital camera 800 has an isochronous end point 1001 used to transfer moving image data, a bulk end point 1002 used to transfer still image data, and an interrupt end point 1003 used to transfer error information (to be described later), as shown in FIG. 8. Furthermore, the digital video camera 800 has a control end point used to receive a command from the PC 902. Data to be transmitted from the isochronous end point 1001 is transferred by isochronous transfer specified by the USB standard, data to be transferred from the bulk end point 1002 is transferred by bulk transfer specified by the USB standard, and data from the interrupt end point is transferred by interrupt transfer specified by the USB standard. An isochronous pipe 1004 as a logical transmission path is set between the isochronous end point 1001 of the digital video camera 800 and the PC 902, a bulk pipe 1005 as a logical transmission path is set between the bulk end point 1002 of the digital video camera 800 and the PC 902, and an interrupt pipe 1006 as a logical transmission path is set between the interrupt end point 1003 of the digital video camera 800 and the PC 902. These logical transmission paths are set by the PC 902.

FIG. 9 shows an example of a request structure of a still image transfer request command to be transmitted from the PC 902 to the digital video camera 800. The request structure shown in FIG. 9 is specified by the USB standard, and is transmitted to the digital video camera as a device via a control end point of the PC 902. This request structure includes, as a basic configuration, bmRequestType 1101, bRequest 1102, wValue 1103, windex 1104, wLength 1105, and Data 1106. Since the still image transfer request command is a command which requests transfer of sensed still image data from the PC 902 to the digital video camera 800, it is also a command that requests remote capture.

When a still image sensing request is sent to a device, 0x0010001 indicating a request unique to a class is set in bmRequestType 1101, SET_CUR indicating control is set in bRequest 1102, a value indicating a still image request is set in wvalue 1103, a value indicating an interface to which the end point used to transfer a still image belongs is set in windex 1104, and a value indicating the number of data of additional information is set in wLength 1105. Also, in Data 1106, a value indicating the still image transfer-mode requested by the PC 902 is set. As shown in FIG. 10, the value of Data 1106 is 0x01 for still image transfer mode 1, 0x02 for still image transfer mode 2, and 0x03 for still image transfer mode 3.

Figure 11:
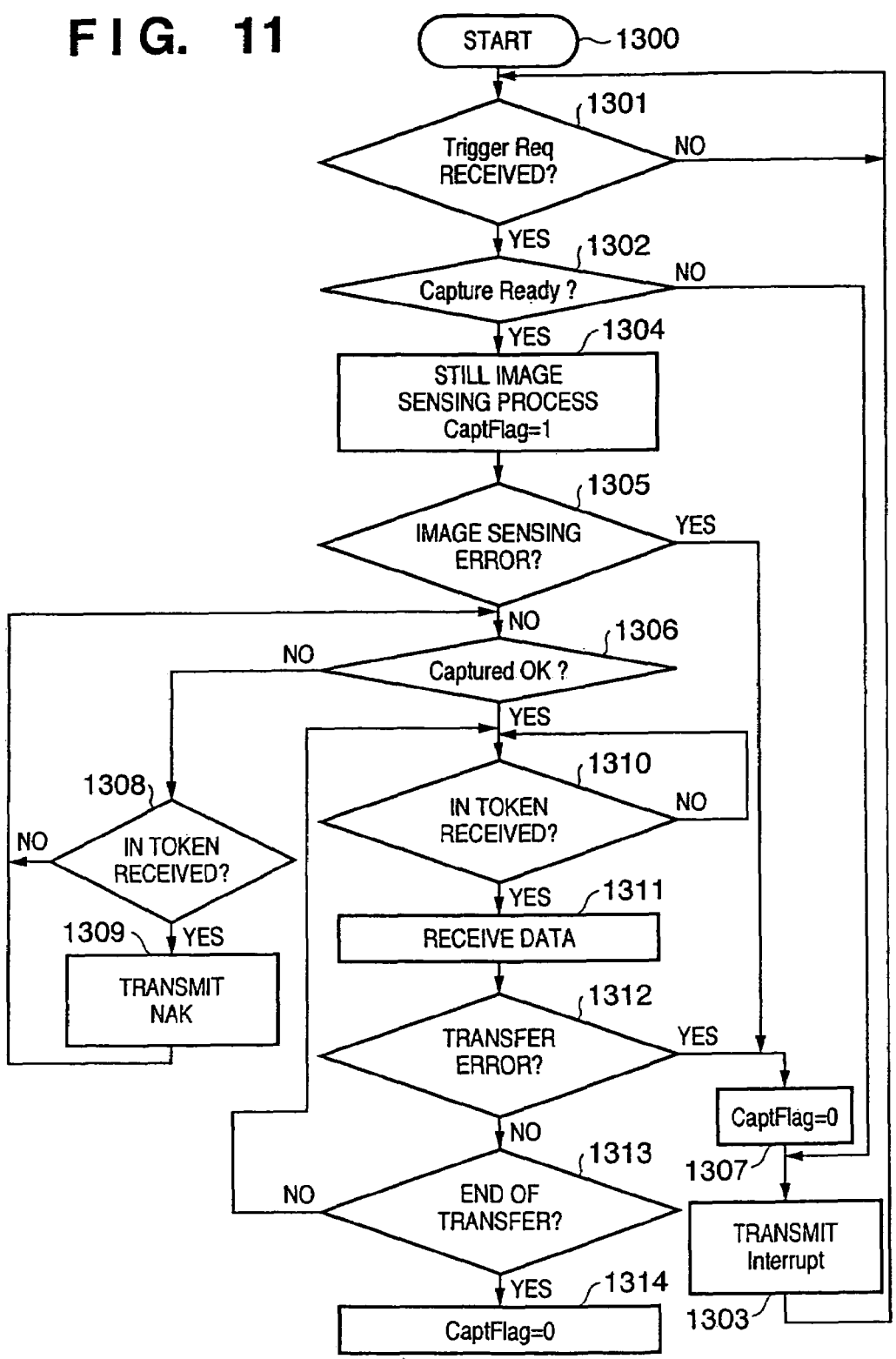
FIG. 11 is a flowchart for explaining the operation of the image sensing device shown in FIG. 6.

The processing executed by the digital video camera 800 having the isochronous end point 1001, bulk end point 1002, and interrupt end point 1003 will be described below with reference to the flowchart of FIG. 11. Note that the processing which will be explained with reference to FIG. 11 is executed by the digital video camera 800 when moving image data of a sensed moving image (also called a moving image stream) is transferred from the digital video camera 800 to the PC 902 via the isochronous end point 1001 and isochronous pipe 1104. Also, the processing which will be explained with reference to FIG. 11 is controlled by the main controller 802 and DIF controller 806.

The DIF controller 806 checks in step 1301 if a still image transfer request command in which the value of Data 1106 is 0x02 is received from the PC 902. If it is determined in step 1301 that the still image transfer request command is received from the PC 902, the flow advances to step 1302.

The DIF controller 806 checks in step 1302 if the camera is ready to sense a still image. If it is determined in step 1302 that the camera is not ready to sense a still image, the flow advances to step 1303; if it is determined that the camera is ready to sense a still image, the flow advances to step 1304. In this embodiment, whether or not the camera is ready to sense a still image is determined based on the value of CaptFlag held by the main controller 802. If the image sensing controller 801 determines that the camera is not ready to sense a still image, the main controller 802 sets the value of CaptFlag to be 1. If the image sensing controller 801 determines that the camera is ready to sense a still image, the main controller 802 sets the value of CaptFlag to be 0. For example, when the image sensing controller 801 is sensing a still image, the main controller 802 sets the value of CaptFlag to be 1. Since the digital video camera can sense a still image during sensing a moving image, the main controller 802 sets the value of CaptFlag to be 0 if a still image is not being sensed even during sensing a moving image.

In step 1303, the DIF controller 806 notifies the PC 902 of error information via the interrupt end point 1003. This error information includes information indicating the error type, information indicating a cause of that error, and the like. The PC 902 can detect the type of error that has occurred in the digital video camera 800, and the cause of that error. At this time, the DIF controller may notify the PC 902 of information indicating the status of the digital video camera 800 when the error has occurred. In this way, the PC 902 can detect the status of the digital video camera 800 when the error has occurred, and can execute a process corresponding to the status. Note that information indicating the type and cause of the error, the status of the digital video camera 800 when the error has occurred, and the like may be held in the internal memory of the digital video camera 800, and may be returned in response to a request from the PC 902.

In step 1304, the image sensing controller 801 begins to sense a still image in accordance with an instruction from the main controller 802. At this time, the main controller 802 sets the value of CaptFlag to be 1. The image sensing controller 801 transfers still image data of the sensed still image to the image processor 805. The image processor 805 compresses that still image data according to a predetermined compression format (e.g., JPEG format), and stores the compressed still image data in an internal memory 811. At this time, the main controller 802 generates additional data to be recorded together with the still image data, and appends it to the still image data in the internal memory 811.

The image sensing controller 801 checks in step 1305 if an error has occurred during sensing of a still image. If it is determined in step 1305 that an error has occurred during sensing of a still image (e.g., if, image sensing of a still image is disabled), the flow jumps to step 1307; otherwise, the flow advances to step 1306.

In step 1307, the main controller 802 sets the value of CaptFlag to be 0. After the flow advances from step 1307 to step 1303, the DIF controller 806 notifies the PC 902 of error information via the interrupt end point 1003. At this time, this error information includes information indicating that an error has occurred during sensing of a still image, information indicating a cause of that error, and the like. The PC 902 can detect based on this error information in real time that an error has occurred during sensing of a still image and the cause of that error.

The main controller 802 checks in step 1306 if capture of still image data is complete. In this embodiment, it is determined that capture of still image data is complete when still image data of the sensed still image has been stored in the internal memory 811 together with its additional data. If it is determined that capture of still image data is complete, the main controller 802 notifies the DIF controller 806 that the camera is ready to transfer still image data. In this case, the flow advances from step 1306 to step 1310. If it is determined that capture of still image data is not complete yet, the main controller 802 notifies the DIF controller 806 that the camera is not ready to transfer still image data. In this case, the flow advances from step 1306 to step 1308.

The DIF controller 806 checks in step 1308 if IN TOKEN is received from the PC 902 via the bulk end point 1002. If it is determined in step 1308 that IN TOKEN is received from the PC 902, the flow advances to step 1309.

If IN TOKEN is received from the PC 902 in step 1309, the DIF controller 806 does not transmit still image data, and transmits NAK via a control point (not shown). The PC 902 detects that the digital video camera 800 cannot transfer still image data upon reception of NAK.

The DIF controller 806 also checks in step 1310 if IN TOKEN is received from the PC 902 via the bulk end point 1002. If IN TOKEN is received from the PC 902, the flow advances from step 1310 to step 1311.

In step 1311, the DIF controller 806 begins to transfer the still image data of the sensed still image in accordance with a still image transfer request command from the PC 902. At this time, the still image data is transferred from the digital video camera 800 to the PC 902 via the bulk end point 1002, and moving image data of a moving image sensed simultaneously with the still image is transferred from the digital video camera 800 to the PC 902 via the isochronous end point 1001. That is, the still image data is transferred according to bulk transfer specified by the USB standard, and the moving image data is transferred according to isochronous transfer specified by the USB standard. At this time, the maximum packet size of one or a plurality of data packets used to transmit still image data is that which is set in the bulk end point 1002.

The DIF controller 806 checks in step 1312 if an error has occurred during transfer of the still image data. If it is determined in step 1312 that an error has occurred during transfer of the still image (e.g., if transfer of still image data is disabled), the flow advances to step 1307; otherwise, the flow advances to step 1313. If the flow advances from step 1307 to step 1303 after the flow advances from step 1312 to step 1307, the DIF controller 806 notifies the PC 902 of error information via the interrupt end point 1003. At this time, this error information includes information indicating that an error has occurred during transfer of still image data, information indicating a cause of that error, and the like. The PC 902 can detect in real time based on this error information that an error has occurred during transfer of still image data, and the cause of that error.

The DIF controller 806 checks in step 1313 if transfer of the still image data ends normally. If transfer of the still image data ends normally, the flow advances to step 1314; otherwise, the flow returns to step 1310.

In step 1314, the main controller 802 sets the value of CaptFlag to be 0, and the flow returns to step 1301 to execute the next remote capture.

In this way, since the digital video camera 800 according to this embodiment has the isochronous end point 1001 for moving image transfer, and the bulk end point 1002 for still image transfer, real-time transfer of the sensed moving image (in other words, moving image streaming of the sensed moving image) and transfer of the still image can be simultaneously done. As a result, sensed still image data can be transferred without interrupting transfer of moving data whose image sensing is in progress.

Also, since the digital video camera 800 according to this embodiment has the interrupt end point 1003 used to notify information of an error and the like, if an error has occurred in still image transfer during moving image streaming, information indicating the type of error, information indicating a cause of the error, and the like can be quickly sent to the PC 902 via the interrupt end point 1003. In this manner, the PC 902 can detect the type of error that has occurred in the digital video camera 800, and the cause of that error. At this time, when the digital video camera 800 notifies the PC 902 of information indicating the status of the digital video camera 800 when the error has occurred via the interrupt end point 1003, more detailed information can be sent to the PC 902. In this case, the PC 902 can detect the status of the digital video camera 800 and the like when the error has occurred, and can execute a process corresponding to that status.

Other Embodiments

The above embodiment can be implemented by supplying software including program codes required to implement the functions of the above embodiment to a controller (including a CPU, MPU, or the like) in a system or device, and executing the program codes stored in that storage medium by the controller (including a computer, CPU, MPU, or the like) in the system or device. In this case, the aforementioned software itself constitutes the present invention. Also, in this case, the above embodiment can be implemented using resources (an operating system, other computer programs, function expansion unit, and the like) inside or outside the system or device.

The above embodiment can also be implemented by supplying a storage medium that stores software including program codes required to implement the functions of the above embodiment to a controller (including a CPU, MPU, or the like) in a system or device, and executing the program codes stored in that storage medium by the controller (including a computer, CPU, MPU, or the like) in the system or device. In this case, the storage medium itself that stores the aforementioned software constitutes the present invention. Also, in this case, the above embodiment can be implemented using resources (an operating system, other computer programs, function expansion unit, and the like) inside or outside the system or device.

Note that the aforementioned embodiment is an example for implementing the present invention. Therefore, the present invention is not limited to the aforementioned embodiment. The present invention includes embodiments obtained by adding changes that can be assumed by a person having normal knowledge in the technical field that the present invention belongs to the aforementioned embodiment.

CLAIM OF PRIORITY

This application claims priority from Japanese Patent Application No. 2003-416912 filed Dec. 15, 2003, which is hereby incorporated by reference herein.

The invention claimed is:

1. An image sensing device comprising:
an image sensing unit that senses a moving image and a still image;
an interface unit that is connected to an external device;
a control endpoint that receives from the external device a command requesting transfer of the still image;
an isochronous endpoint that transfers the moving image sensed by the image sensing unit to the external device;
a bulk endpoint that transfers the still image sensed by the image sensing unit to the external device;
an interrupt endpoint that transfers first error information and second error information to the external device, the first error information including information indicating that a first error has occurred during sensing of the still image, and the second error information including information indicating a second error has occurred during transfer of the still image and information indicating a status of the image sensing device when the second error has occurred; and
an interface unit controller that transfers the first error information to the external device through the interrupt endpoint if the first error has occurred during sensing of the still image, and transfers the second error information to the external device through the interrupt endpoint if the second error has occurred during the transfer of the still image.

2. The image sensing device according to claim 1, wherein the interface unit complies with the USB (Universal Serial Bus) standard.

3. The image sensing device according to claim 1, wherein the image sensing device is a digital video camera.

4. A method of controlling an image sensing device, the image sensing device including (a) an image sensing unit that senses a moving image and a still image and (b) an interface unit that is connected to an external device, the method comprising the steps of:

receiving, from the external device via a control endpoint, a command requesting transfer of the still image;

transferring the moving image sensed by the image sensing unit to the external device via an isochronous endpoint;

transferring the still image sensed by the image sensing unit to the external device via a bulk endpoint; and transferring first error information and second error information to the external device via an interrupt endpoint, the first error information including information indicating that a first error has occurred during sensing of the still image, and the second error information including information indicating a second error has occurred during transfer of the still image and information indicating a status of the image sensing device when the second error has occurred, wherein the first error information is transferred to the external device through the interrupt endpoint if the first error has occurred during the sensing of the still image, and wherein the second error information is transferred to the external device through the interrupt endpoint if the second error has occurred during the transfer of the still image.

5. The method according to claim 4, wherein the interface unit complies with the USB (Universal Serial Bus) standard.

6. The method according to claim 4, wherein the image sensing device is a digital video camera.

* * * * *